(12) United States Patent
Bushnell et al.

(10) Patent No.: US 6,966,308 B2
(45) Date of Patent: Nov. 22, 2005

(54) VAPOR FUELED ENGINE

(75) Inventors: Raymond Bryce Bushnell, Beavercreek, OR (US); Danny Robert Lewis, Beavercreek, OR (US); Robert William Parry, Oregon City, OR (US)

(73) Assignee: Vapor Fuel Technologies, Inc., Beavercreek, OR (US)

( * ) Notice: Subject to any disclaimer, the term of this patent is extended or adjusted under 35 U.S.C. 154(b) by 0 days.

(21) Appl. No.: 11/073,233

(22) Filed: Mar. 4, 2005

(65) Prior Publication Data

US 2005/0145227 A1 Jul. 7, 2005

Related U.S. Application Data

(63) Continuation of application No. 10/706,507, filed on Nov. 11, 2003, now Pat. No. 6,907,866.

(51) Int. Cl.[7] .............................................. F02G 5/02
(52) U.S. Cl. ...................... 123/546; 123/672
(58) Field of Search ................ 123/545, 546, 123/547, 543, 527, 672

(56) References Cited

U.S. PATENT DOCUMENTS

| | | |
|---|---|---|
| 3,442,632 A | 5/1969 | Mayland |
| 3,468,641 A | 9/1969 | Gross |
| 3,471,274 A | 10/1969 | Quigley |
| 3,572,297 A | 3/1971 | Murray |
| 3,792,688 A | 2/1974 | Grainger |
| 3,799,124 A | 3/1974 | Swain |
| 3,897,757 A | 8/1975 | Abello |
| 3,963,000 A | 6/1976 | Kosaka |
| 3,995,421 A | 12/1976 | Kuroiwa |
| 3,995,600 A | 12/1976 | DeLuca |
| 4,016,837 A | 4/1977 | Wentworth, Jr. |
| 4,047,512 A * | 9/1977 | Hough et al. ................ 123/557 |
| 4,079,703 A | 3/1978 | Yamane |
| 4,086,878 A | 5/1978 | Eisele |
| 4,099,499 A * | 7/1978 | Giardini et al. ............. 123/557 |
| 4,112,875 A | 9/1978 | Fletcher |
| 4,112,889 A | 9/1978 | Harpman |
| 4,141,326 A | 2/1979 | Wolber |
| 4,181,100 A | 1/1980 | Yamane |
| 4,193,755 A | 3/1980 | Guarnaschelli |
| 4,274,383 A | 6/1981 | Adams |
| 4,367,700 A | 1/1983 | Pace |
| 4,368,712 A | 1/1983 | Jackson |
| 4,370,970 A | 2/1983 | Kunz |
| 4,385,615 A | 5/1983 | Keane |
| 4,389,981 A | 6/1983 | Meyer |
| 4,458,634 A | 7/1984 | Carr |
| 4,508,064 A | 4/1985 | Watanabe |
| 4,622,924 A | 11/1986 | Lewis |
| 4,628,871 A | 12/1986 | Glass |

(Continued)

OTHER PUBLICATIONS

Robert Felix, "A History of Vapor Carburetors," www.keelynet.com/energy/gunnhist.htm, ISSN 1464-6935, Jan. 31, 1999, 24 pgs.

Primary Examiner—Henry C. Yuen
Assistant Examiner—Arnold Castro
(74) Attorney, Agent, or Firm—Schwabe, Williamson & Wyatt, P.C.

(57) ABSTRACT

A fuel supply assembly is provided that may allow for use of vaporized fuel to power an engine and enhance fuel efficiency. The fuel supply assembly may include a vaporizing tank, a heating source, a temperature control and a monitoring and control system configured to control intermixing of ambient air and vaporized gasoline to maintain a desired hydrocarbon level in an exhaust.

8 Claims, 4 Drawing Sheets

U.S. PATENT DOCUMENTS

| | | |
|---|---|---|
| 4,665,879 A | 5/1987 | Earl |
| 4,807,584 A * | 2/1989 | Davis .......................... 123/557 |
| 4,881,507 A | 11/1989 | San Filipo |
| 4,953,514 A | 9/1990 | Beicht |
| 4,955,351 A | 9/1990 | Lewis |
| 5,085,176 A | 2/1992 | Brinkley, III |
| 5,088,452 A | 2/1992 | Iwaki |
| 5,092,281 A | 3/1992 | Iwaki |
| 5,115,768 A | 5/1992 | Peschka |
| 5,119,768 A | 6/1992 | Russell |
| 5,140,966 A | 8/1992 | Wong |
| 5,178,118 A | 1/1993 | Nakamats |
| 5,183,011 A | 2/1993 | Fujii |
| 5,226,400 A | 7/1993 | Birch |
| 5,282,497 A | 2/1994 | Allison |
| 5,293,857 A | 3/1994 | Meyer |
| 5,359,968 A | 11/1994 | Shiraishi |
| 5,363,828 A | 11/1994 | Yamashita |
| 5,398,663 A | 3/1995 | Kulasinghe |
| 5,438,961 A | 8/1995 | Peschka |
| 5,462,021 A | 10/1995 | Minami |
| 5,548,952 A | 8/1996 | Stock |
| 5,603,290 A | 2/1997 | Swain |
| 5,743,080 A | 4/1998 | Ginter |
| 5,752,157 A | 5/1998 | Yamashita |
| 5,765,538 A | 6/1998 | Krimmer |
| 5,782,225 A | 7/1998 | Caggiano |
| 5,816,223 A | 10/1998 | Jamrog |
| 5,832,718 A | 11/1998 | Suttrop |
| 5,890,472 A | 4/1999 | Saito |
| 5,899,188 A | 5/1999 | Firey |
| 5,934,260 A | 8/1999 | Gadkaree |
| 5,944,003 A | 8/1999 | Osanai |
| 5,946,916 A | 9/1999 | Ven |
| 5,979,418 A | 11/1999 | Saruwatari |
| 6,003,312 A | 12/1999 | Schlichtig |
| 6,015,133 A | 1/2000 | DeLand |
| 6,044,831 A | 4/2000 | Takagi |
| 6,053,153 A | 4/2000 | Moser |
| 6,067,966 A | 5/2000 | Saito |
| 6,076,355 A | 6/2000 | Ven |
| 6,095,121 A | 8/2000 | Osanai |
| 6,116,221 A | 9/2000 | Matsumoto |
| 6,119,651 A | 9/2000 | Anderson |
| 6,138,644 A | 10/2000 | Saruwatari |
| 6,138,655 A | 10/2000 | Kerns |
| 6,155,239 A | 12/2000 | Dykstra |
| 6,681,749 B2 | 1/2004 | Bushnell |

* cited by examiner

VAPOR FUELED ENGINE

RELATED APPLICATIONS

This is a continuation of U.S. patent application Ser. No. 10/706,507 entitled "Vapor Fueled Engine" filed on Nov. 11, 2003 now U.S. Pat. No. 6,907,866.

FIELD OF THE INVENTION

This invention relates to the use of vaporized fuel to power an engine and, more particularly, to improvements that enhance fuel efficiency.

BACKGROUND OF INVENTION

It is known that under some conditions the use of vaporized fuel versus liquid fuel for gasoline powered vehicles can reduce the emission of hydrocarbons conveyed into the atmosphere, while also increasing fuel efficiency. The problem that has lingered is how to obtain and retain those benefits over the changing conditions in which such vehicles are typically driven.

SUMMARY OF THE INVENTION

As known and as described in the commonly owned U.S. patent application Ser. No. 10/002,351, (incorporated herein by reference), fuel efficiency can be improved by heating a quantity of gasoline to cause vaporization, directing the vapor into a stream of ambient air, establishing a desired air-to-fuel mixture and directing the mixture into the intake manifold of an engine.

Whereas the system as disclosed in the above application has resulted in significant improvement, it has not achieved the consistency of operation desired.

It is known that there is an optimum fuel-to-air mixture that needs to be maintained. A fuel-to-air mixture of 1 to 20 is likely too rich resulting in an unacceptable percentage of hydrocarbons in the fuel that are not properly combusted and fuel efficiency is reduced. A 1 to 40 mixture is too lean with today's catalytic converters (CATs) and produces an emission of nitrogen oxide that is prohibited by the EPA emission standards. A fuel-to-air mixture of about 1 to 30 is about optimal for current gasoline engines used in vehicles and an objective of the invention is to control the fuel-to-air mixture to maintain the ratio in the range substantially at, e.g., 1 to 30.

Consistent with the above objective, the mixture is monitored and adjusted throughout operation of the engine. This is accomplished automatically by the use of valves that control the flow of vapor fuel and/or ambient air that is mixed prior to entry of the vapor fuel into the engine's intake manifold. The valves are coupled to a control that is in turn coupled to a vehicle's 02 sensor which senses 02 emissions in a vehicle's exhaust (a standard feature on most modern vehicles.) It has been learned that the 02 emissions are directly related to hydrocarbon emissions which as explained is a reflection of the fuel-to-air mixture.

In the preferred embodiment, an electrical output from the 02 sensor is transmitted to the mentioned control. It is known that the desired reading for the voltage output of the sensor as measured by the control is, e.g., 3 volts. At startup, the reading will typically be at, e.g., 4 volts, indicating a too rich mixture but desirable for startup and warming of the engine. After a time delay to accommodate warm up, any reading above or below, e.g., 3, will activate the control for opening and closing the valve or valves which control ambient air flow and vaporized fuel flow (more accurately an enriched mixture of air and fuel). For example, a 3.2 reading will produce an opening of the ambient air valve and/or a closing of the vaporized fuel flow. A 2.8 reading will produce the reverse.

Whereas it would be presumed and has been assumed that an established fixed setting of fuel-to-air mixture would produce a stabilized mixture throughout the operation of the engine, such has been determined to be not the case. There are many variables that need to be controlled or accommodated. The liquid fuel temperature is known to have the greatest impact on hydrocarbon emissions and fuel efficiency, and that temperature will vary by small but very significant degrees of temperature due to environmental changes, i.e., temperature, elevation, humidity, and the like. Thus, in the preferred embodiment, a quantity of fuel to be vaporized is precisely temperature controlled to substantially eliminate the effect of such environmental variables.

Regardless, there still remain significant changes that are not controlled simply by maintaining the liquid fuel temperature. These remaining variables are accordingly accommodated by monitoring the 02 sensors. To the extent that the fuel mixture strays from the desired reading from the 02 monitor, the mixture is corrected, i.e., by changing the setting of a valve or valves.

Whereas the above improvements are considered the primary features for the preferred embodiment, the following is also considered to provide additional benefit.

Again in the preferred embodiment, a quantity of liquid fuel, e.g., one gallon of fuel, is inserted into a vaporization tank. The fuel occupies, e.g., the lower half of the tank, and a heating element and temperature sensor is provided in the fuel-containing portion of the tank. The temperature is set and maintained at, e.g., 74 degrees, and that temperature causes vaporization of the fuel, the vapor rising from the liquid surface into the upper half of the tank. Within the tank, in the upper half, there is an ambient air inlet and a vaporized fuel outlet. A sequence of baffles directs air from the inlet and across the surface of the liquid fuel to the outlet which is connected to an outer first conduit. The ambient air temperature is stabilized by its movement over the liquid and in the process mixes with the rising fuel vapor. As expelled through the outlet and into the first conduit, such becomes the vaporized fuel heretofore alluded to and which is perhaps more correctly identified as an enriched fuel air mixture. A secondary source of ambient air is conducted through a second conduit and merges with the vaporized fuel of the first conduit. Prior to said joining of the air and vaporized fuel, at each or a selected one of the first and second conduits, control valves are provided which control the flow volume from the respective conduits to vary the amount of ambient air and vaporized fuel that is combined into a third conduit or continuing conduit (also referred to as a mixing chamber) which in turn conveys the mixture to the engine's intake manifold.

A further problem for which a solution had to be derived was the discovery that the process as described, when vaporizing the common gasolines that are commercially available, generates a liquid residual that does not readily vaporize, e.g., at the temperature setting considered otherwise optimal. Over a period of time, this liquid residual becomes a greater and greater portion of the liquid content of the vaporization tank. Thus, a provision is made for a periodic purging of the liquid residual from the tank.

Whereas it was determined that the residual liquid burned acceptably well in conventional engines, and particularly to the extent that the systems of the preferred embodiment are adaptable and applied as retrofits to such conventional engines, a first solution is the alternate running of the engine, i.e., on vaporized fuel as described above, and then, as desired, converting back to conventional liquid fuel operation wherein the residual liquid is used to fuel the engine. A recycling procedure may be established to (a) fill the tank with e.g., a gallon of liquid gasoline; (b) vaporizing 80% of the fuel and then switching to conventional engine operation to burn off the liquid residual; and (c) refill the tank and switch back to vaporized fuel. Other solutions are certainly contemplated. The residual can be simply extracted from the tank on a periodic basis, stored until refueling is required, and then disposed of or preferably transferred for use in a conventional engine use. It is theorized that the residual can also be eliminated by periodic higher temperature vaporization which may vaporize the residual at some but acceptable loss of efficiency.

The invention will be more fully appreciated and understood by reference to the following detailed description and drawings referred to therein.

DESCRIPTION OF THE PREFERRED EMBODIMENT

Figure 1:
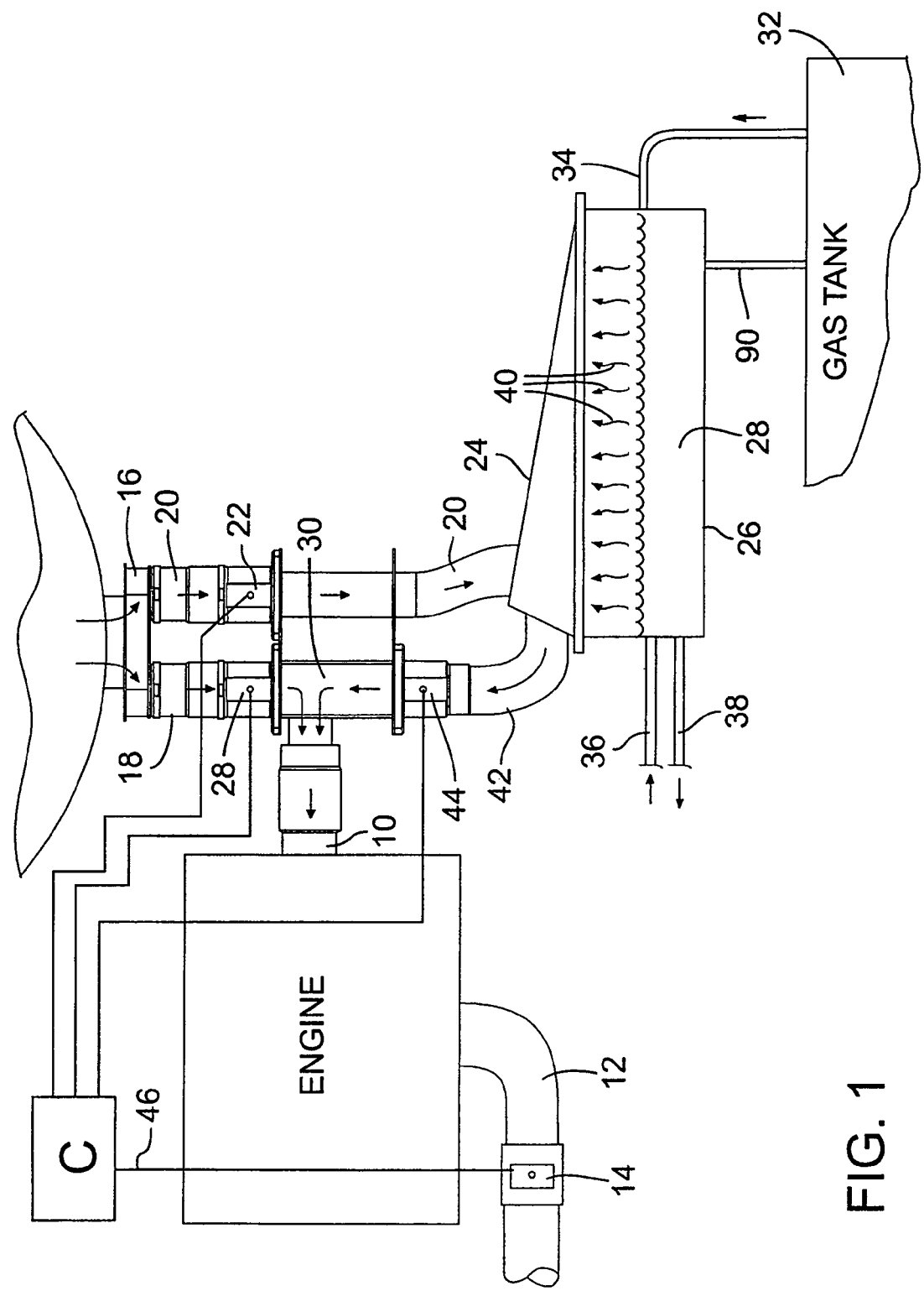
FIG. 1 is a schematic overview of a preferred embodiment of the invention.

Reference is made to FIG. 1, which provides a schematic overview of the components of a system in accordance with the present invention. A gasoline-powered engine as labeled, includes an intake port 10 connected to the engine's throttle body. The engine, when operating, draws air and fuel through port 10. The engine includes an exhaust pipe 12 that is equipped with an O2 sensor 14. The engine, intake port 10 and O2 detector 14 may be standard equipment provided for a conventional gasoline-driven vehicle, and the remainder of the components of the illustrated embodiment are incorporated into the system to achieve the objectives of the present invention.

Item 16 represents an air box through which ambient air is drawn when operating the engine. Air conducting conduits 18 and 20 from air box 16 provide the desired airflow to the remainder of the system as will be described.

Conduit 20 includes a valve 22 that controls the volume of air directed through conduit 20 and which is conveyed to a vapor producing tank 26 via the tank's top or cover 24.

Conduit 18 includes a valve 28 which controls the volume of ambient air that is directed into a mixing chamber 30.

Returning to the vapor-producing tank 26, the tank is provided with flow control apparatus, e.g., baffles, which will be later explained, but for this overview description it will be understood that air from conduit 20 (as controlled by valve 22) enters the tank 26 through the top 24, liquid fuel 28 is drawn from a gas tank 32 via conduit 34, hot water heating coils immersed in the liquid fuel via inlets and outlets 36, 38 heat the gas/fuel 28 and generate vapors 40. The vapors are picked up by the airflow from air conduit 20 and directed out through conduit 42 to the mixing chamber 30 but controlled by valve 44. The air vapor mixture of conduit 42 is intermixed in mixing chamber 30 with ambient air from conduit 18, and the mixture is directed through the intake port 10 and from there into the combustion tank of the engine.

Figure 2:
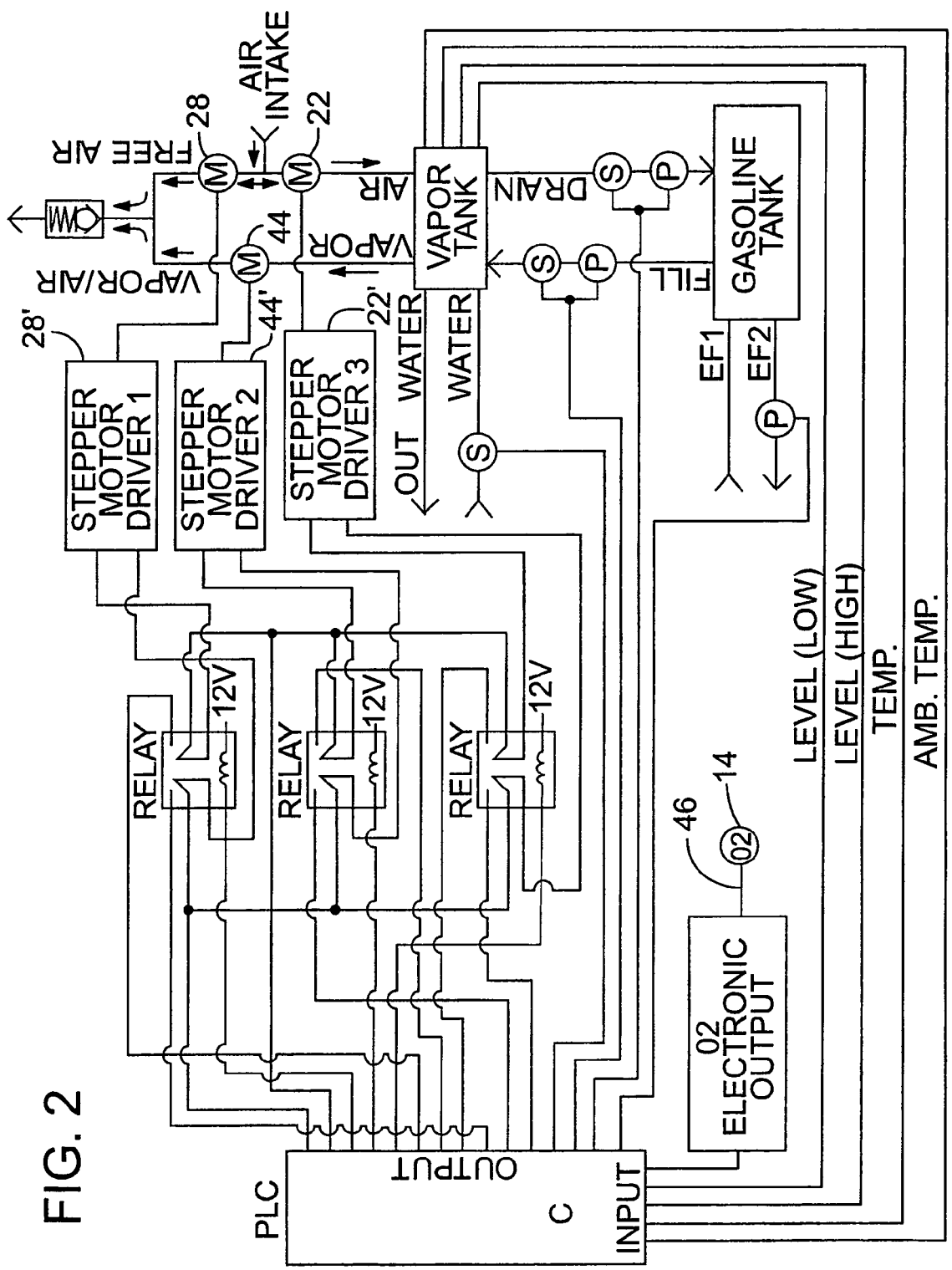
FIG. 2 is an operational diagram of the system utilized for the embodiment of FIG. 1.

Reference is now also directed to FIG. 2 which illustrates an automatic control process for the air, vapor, and fuel flow rates referred to in FIG. 1. Each valve 22, 28 and 44 are opened and closed as desired (between any of the unlimited positions between fully opened and fully closed) by motors, e.g., stepper motors 22', 28' and 44'.

It has been determined that fuel efficiency can be measured by the hydrocarbons that are emitted from the vehicle exhaust. Unfortunately, the elimination of hydrocarbons from gasoline-produced engines currently available cannot be total as such produces an undesired and unpermitted emission of nitrogen oxides. Thus, one first determines the level of nitrogen oxide that is permitted and then the lowest level of hydrocarbons that will stay within the limits permitted for the restriction on nitrogen oxide.

It has further been determined that O2 detectors for detecting a level of O2 in the vehicle's exhaust and which have been incorporated into the exhaust system of later model vehicles, are directly related to the level of hydrocarbons in that same exhaust. Thus, one can determine what O2 reading of the detector 14 produces the optimum fuel efficiency. For example, a desired hydrocarbon level may be determined to exist when the O2 monitor produces a reading of 3 volts.

Returning to FIG. 1, it has been determined that fuel efficiency is achieved by controlling the ratio of fuel-to-air mixture achieved at the mixing chamber 30 from which the mixture enters the engine intake throttle body. It is known that the vapor-air-mixture directed into the mixing chamber 30 from conduit 42 is too rich, e.g., 1 part fuel to 10 parts air, and of course the air only from conduit 18 has zero parts fuel. The desired mixture may be that which achieves a 30 to 1 ratio, e.g., of 2 cubic feet of air, through valve 28 for each cubic foot of air/vapor through valve 44.

Whereas the valves 28 and 44 can be set to achieve the desired mixture at a given point in time, it has been learned that many factors affect the ratio achieved in the vapor/fuel mixture flowing through conduit 42.

Assuming a specific hydrocarbon emission is desired, a reading of the O2 detector will verify that this desired mixture has been achieved, as that reading also indicates the hydrocarbons in the exhaust. As explained, a fixed setting will not likely achieve the optimum ratio over any given period of time. Any temperature change, any elevational change and even differences in fuel make up will skew the vapor/fuel mixture flowing from the tank 26 to the mixing chamber 30.

Figure 4:
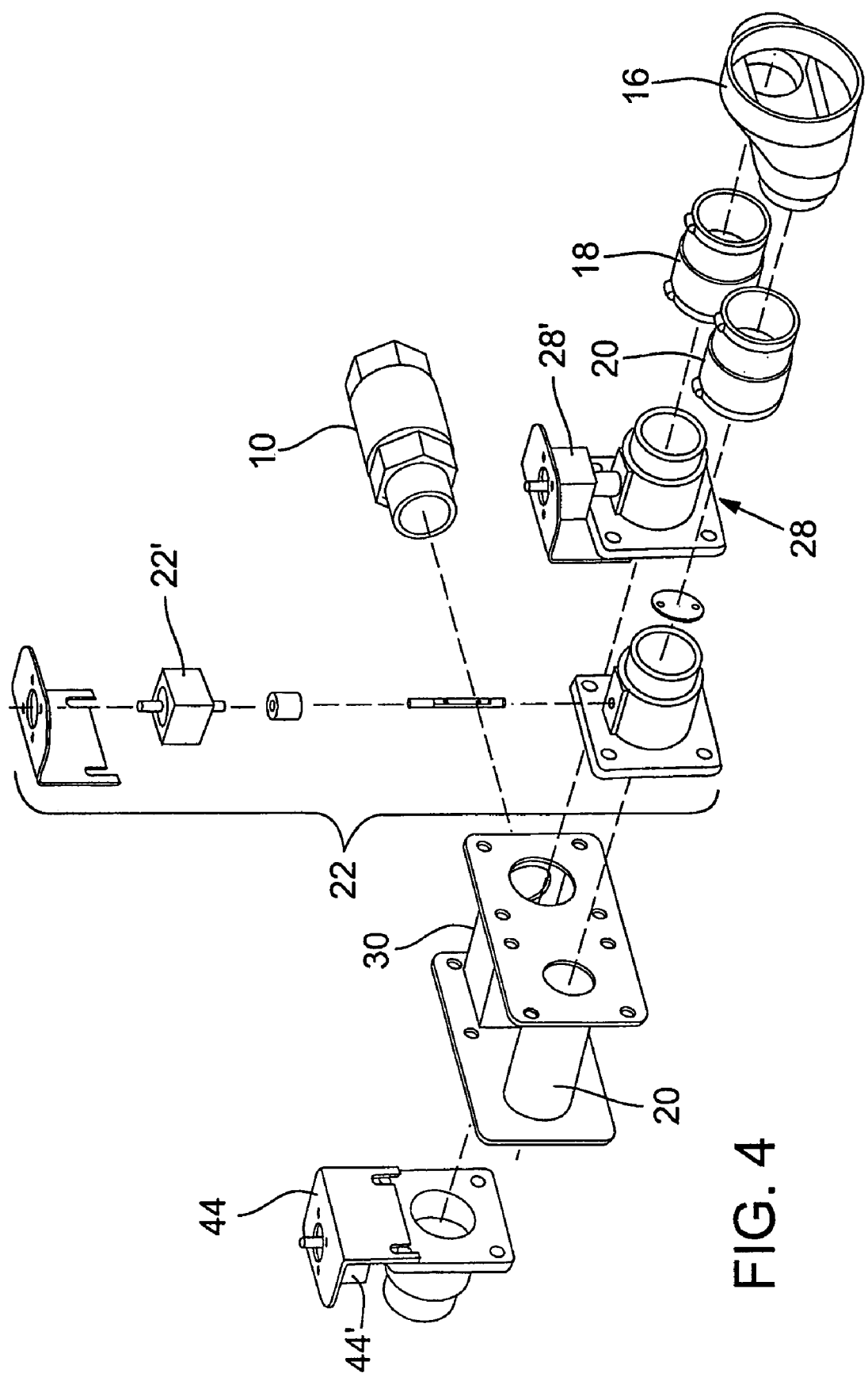
FIG. 4 is a further exploded view illustrating in particular the control valves of the system of FIGS. 1 and 2.

Accordingly, the valves 22, 28 and 44 are operated by stepper motors 22', 28' and 44' (illustrated in the flow chart of FIG. 2 and in exploded perspective view in FIG. 4) which stepper motors are automatically operated by computer C. Computer C monitors the O2 and thus the hydrocarbon emissions in exhaust 12 and should those readings indicate too high or too low hydrocarbons, the stepper motors are activated by the computer to change the relative fluid volumes from conduit 18 and conduit 42. Should the reading show a too high hydrocarbon level, the vapor/air flow of conduit 44 needs to be lessened, e.g., the valve 44 closed, or, e.g., the valve 28 opened, or, e.g., both closing of valve 44 and opening of valve 28.

The adjustment may take place in stages, i.e., a 1° closing of valve 44, a re-reading of the O2 detector followed by repeated partial closing of valve 44 or alternatively the partial opening of valve 18 or a combination of both. Valve 22 can also be a factor as restricting air flow into conduit 20 will slow the flow of air to the tank 26, thus to conduit 40, while also diverting more airflow through valve 28.

The structure as described enables the designer to design a system that will theoretically provide the desired result in fuel-to-air mixture (e.g., 1 to 30) as deemed desirable, but then in recognition of the impact of small environmental changes that produce substantial deviations in efficiency, provide automatic adjustments that are responsive to real time readouts from an exhaust monitor, e.g., an 02 detector.

Figure 3:
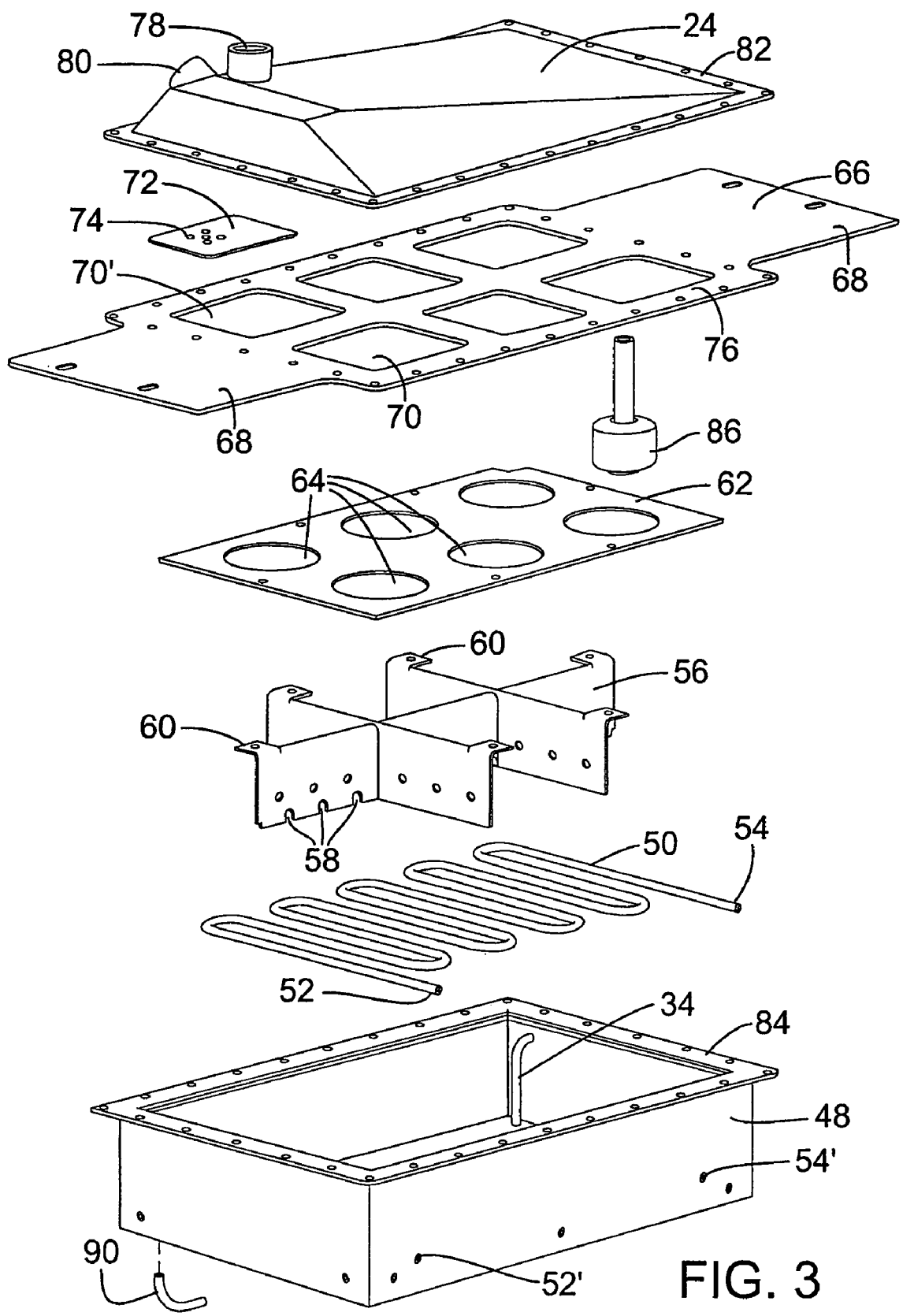
FIG. 3 is an exploded view of the vaporization tank of FIG. 1.

Reference is now made to FIG. 3, which illustrates the components of the vaporizing tank 26. The tank 26 consists of a metal box 48 having dimensions of about 4"×8"×12". Fitted to the bottom of the tank is a hot water coil 50 that includes an inlet 52 and outlet 54 which, when assembled to the box 48, extends from the box via inlet 52' and outlet 54'.

Seated onto the box bottom and over the coil 50 is a baffle grid 56. The plates of the baffle grid 56 include slots 58 which enable the seating of the grid over the coil 50. Baffle grid 56 includes fastener tabs 60 and assembled to the fastener tabs 60 is a lower baffle plate 62 having spaced circular opening 64. The baffle plate 62 is seated below the upper edge of box 48 (defined by flange 84) and affixed to the flange 84 is an upper baffle plate 66. Extending flanges 68 of baffle plate 66 protrude laterally from the box and provide the means to secure the box 48 to the body of the vehicle. Upper flange 68 has rectangular openings 70.

Secured to the upper baffle plate 66 and in alignment with an air inlet to be described is a secondary upper baffle plate 72, reduced in size and secured to the upper plate 66 so as to cover a substantial portion of the opening 70'. Provided in this secondary plate is a plurality of small holes, e.g., five holes 74 having a size of about a quarter inch in diameter. Baffle plate 72 provides an impediment to airflow from air inlet 78 and diverts the air flow laterally and downwardly within the tank 26.

Completing the assembly is the top or cover 24 which has a complex shape which can be described as a distorted pyramid shape. The apex of the pyramid shape is positioned at one end whereat an air inlet 78 is provided A vapor air outlet 80 is provided at the same end but along the side wall of the pyramid shape. A flange 82 forming the peripheral edge of the top 24 includes bolt holes which line up with bolt holes in flange portion 76 of baffle plate 66 and with bolt holes in a flange 84 forming the peripheral edge of box 48. Bolts (not shown) are inserted through the aligned bolt holes to fasten the components together. A float 86 contained in the box 48 determines the level of liquid gasoline contained in the box. The liquid gasoline enters the box through conduit 34 and a recycling conduit 90 is provided to drain and/or circulate the gasoline in the vaporizing tank 26 as may be desired.

In operation liquid gasoline is filled to a level of about ¾ inch in the bottom of the box 48 which is above the position of the heater coils 50 and below the top of the baffle grid 56. The baffle grid 56 and baffle plate 62 primarily prevent sloshing of the gasoline during driving of the vehicle. As the liquid gasoline vaporizes (induced by the heating coil 50) air from inlet 78 is dispersed across the liquid surface via baffle plates 72 and 68 which collects vapors 40 (see FIG. 1) and is then directed through outlet 80 and to the mixing chamber 30 via conduit 42 as previously discussed.

As gasoline is vaporized and drawn from the surface of the liquid gasoline, the gasoline level diminishes which is detected by the float 86. As determined desirable by the system, the gasoline is replenished through inlet 34. After some period of time, the gasoline starts to become contaminated (does not vaporize) and it is desirable to purge the tank. This can be done by converting the engine to gasoline use and drawing the residual gas of the tank 26 through the conventional gas injection system. It can also be simply drained into a holding tank and utilized for other power equipment, e.g., a powered law mower.

Whereas the above is considered a preferred embodiment, the reader will readily understand that numerous modifications and variations may be made without departing from the intended scope of the invention. Accordingly, the invention is not limited to the structures as described above but fully encompasses the definitions of the appended claims.

What is claimed is:

1. A fuel supply assembly for a gasoline fueled engine including a combustion chamber for combusting fuel, and an exhaust for the combusted fuel, which assembly comprises:

a vaporizing tank, a quantity of liquid gasoline fuel contained in the tank, a heating source for heating the liguid gasoline fuel, and a temperature control for controlling the temperature of the liquid gasoline fuel as contained in the tank;

said temperature control maintaining the temperature of the liquid gasoline fuel at a determined temperature to produce vaporization of the fuel which rises from the surface of the liquid, a conduit arrangement conveying the vaporized gasoline fuel from the tank, a primary source of ambient air mixed with the vaporized gasoline fuel conveyed by said conduit arrangement and said conduit arrangement conveying the intermixed ambient air and vaporized fuel to the engine for combustion; and an automatic control substantially continuously monitoring the engine exhaust during operation of the engine and controlling the intermixing of the ambient air and vaporized gasoline fuel to maintain a desired hydrocarbon level in the exhaust throughout environmental and load demand conditions.

2. A fuel supply assembly as defined in claim 1 wherein a secondary source of the ambient air is directed into and through the tank for collecting and conveying an enriched vaporized air and fuel mixture into the conduit to be thereafter combined with the primary source of ambient air.

3. A fuel supply assembly as defined in claim 2 wherein a valve is provided for one or both of the primary source of ambient air and enriched vaporized gasoline fuel and air mixture, said one or both valves controlling the intermixing of said primary ambient air and vaporized gasoline and air mixture.

4. A fuel supply assembly as defined in claim 3 wherein said control comprises a sensor sensing combustion exhaust of said engine for determining the presence of hydrocarbons in said exhaust, said valve responsive to said sensor for modifying said intermixing and to thereby maintain a desired content of hydrocarbons in said exhaust.

5. A fuel supply assembly as defined in claim 4 wherein said sensor senses $0^2$ emissions and said control determines the hydrocarbons based on the $0^2$ emissions.

6. A fuel supply assembly as defined in claim 2 wherein a baffle arrangement in the tank directs air from said secondary source over the surface of the liquid fuel for stabilizing the temperature of said air as the air collects and conveys the vaporized fuel.

7. A fuel supply assembly as defined in claim 1 wherein said fuel source assembly is provided as an alternate fuel source to said engine.

8. A fuel supply assembly as defined in claim 7 wherein the fuel as vaporized produces a residual fuel portion and a control for selectively providing vaporized fuel or a liquid fuel to the combustion chamber, said residual fuel conveyed to said combustion chamber as liquid fuel.

* * * * *

UNITED STATES PATENT AND TRADEMARK OFFICE
CERTIFICATE OF CORRECTION

PATENT NO. : 6,966,308 B2
APPLICATION NO. : 11/073233
DATED : November 22, 2005
INVENTOR(S) : Bushnell et al.

Page 1 of 1

It is certified that error appears in the above-identified patent and that said Letters Patent is hereby corrected as shown below:

Figure 1
Reference number "46" should be deleted.

Figure 2
Reference number "46" should be deleted.

Column 4
Line 63, "...conduit 44..." should read --...conduit 42...--.

Column 5
Line 4, "...conduit 40..." should read --...conduit 42...--.
Line 16, "...hot water coil 50..." should read --...heating coil 50...--.
Line 24, "...circular opening 64." should read --...circular openings 64.--.
Line 32, "...upper plate 66..." should read --...upper baffle plate 66...--.
Line 42, "...provided A vapor..." should read --...provided. A vapor...--.
Lines 62-63, "...baffle plates 72 and 68..." should read --...baffle plates 72 and 66...--.

Column 6
Line 2, "...inlet 34." should read --...conduit 34--.
Line 23, "...liguid gasoline..." should read --...liquid gasoline...--.

Signed and Sealed this

Twelfth Day of June, 2007

JON W. DUDAS
*Director of the United States Patent and Trademark Office*